(12) United States Patent
Inoue

(10) Patent No.: US 12,428,000 B2
(45) Date of Patent: Sep. 30, 2025

(54) CONTACT STATE DETERMINATION APPARATUS

(71) Applicant: SUBARU CORPORATION, Tokyo (JP)

(72) Inventor: Shinya Inoue, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 102 days.

(21) Appl. No.: 18/455,820

(22) Filed: Aug. 25, 2023

(65) Prior Publication Data

US 2024/0083444 A1 Mar. 14, 2024

(30) Foreign Application Priority Data

Sep. 9, 2022 (JP) ................................ 2022-143728

(51) Int. Cl.
*B60W 40/109* (2012.01)
(52) U.S. Cl.
CPC ..... *B60W 40/109* (2013.01); *B60W 2520/105* (2013.01)
(58) Field of Classification Search
CPC ......... B60W 40/109; B60W 2520/105; B60W 2520/125; B60R 21/0136
USPC ......................................................... 701/70
See application file for complete search history.

(56) References Cited

U.S. PATENT DOCUMENTS

| | | | | |
|---|---|---|---|---|
| 6,390,498 B1* | 5/2002 | Francis | ................... | G01P 15/18 |
| | | | | 180/282 |
| 7,546,193 B2* | 6/2009 | Oishi | .................. | B60R 21/0132 |
| | | | | 180/282 |
| 2015/0343977 A1* | 12/2015 | Jeong | .................. | B60R 21/0132 |
| | | | | 701/45 |
| 2017/0232919 A1* | 8/2017 | Miyata | ................ | B60R 21/0132 |
| | | | | 701/45 |
| 2019/0293679 A1* | 9/2019 | Iguchi | ..................... | G01P 15/18 |

FOREIGN PATENT DOCUMENTS

| | | | |
|---|---|---|---|
| JP | 2001-247001 A | | 9/2001 |
| JP | 2006160066 A | * | 6/2006 |
| JP | 2017-144747 A | | 8/2017 |

\* cited by examiner

*Primary Examiner* — Logan M Kraft
*Assistant Examiner* — Joshua Campbell
(74) *Attorney, Agent, or Firm* — Rimon P.C.

(57) ABSTRACT

A contact state determination apparatus to be applied to a vehicle includes right and left frame lateral acceleration sensors, a vehicle compartment acceleration sensor, and a contact state determination processor. The contact state determination processor is configured to determine a contact state of the vehicle, based on outputs of the right and left frame lateral acceleration sensors and the vehicle compartment acceleration sensor. The contact state determination processor is configured to determine that the contact state is an oblique contact when: the right and left frame lateral acceleration sensors detect the lateral acceleration rates that are in a same direction and are greater than or equal to a predetermined value; and the longitudinal acceleration rate detected by the vehicle compartment acceleration sensor or an integrated value of the longitudinal acceleration rate is greater than or equal to a predetermined oblique contact determination value.

10 Claims, 7 Drawing Sheets

CONTACT STATE DETERMINATION APPARATUS

CROSS-REFERENCE TO RELATED APPLICATIONS

The present application claims priority from Japanese Patent Application No. 2022-143728 filed on Sep. 9, 2022, the entire contents of which are hereby incorporated by reference.

BACKGROUND

The disclosure relates to a contact state determination apparatus that determines a contact state of a vehicle such as an automobile.

Japanese Unexamined Patent Application Publication (JP-A) No. 2001-247001 discloses an example of a technique related to, for example, contact detection of a vehicle such as an automobile. To accurately determine whether a contact state of a vehicle is a head-on contact, the technique determines a contact state using a fact that, when the contact state is the head-on contact, a normalized trajectory of a time integration value of a deceleration rate detected by a floor sensor with respect to time is accurately approximated to a quadratic curve, and when, although being a symmetrical contact, the contact state is other than the head-on contact, the trajectory that is normalized in a similar manner significantly deviates from a quadratic curve.

JP-A No. 2017-144747 discloses, to determine the contact state with high accuracy, an activation control device for an occupant protection apparatus. The activation control device includes left and right front sensors and an activation control unit. JP-A No. 2017-144747 discloses identifying the contact state by determining to which region that is previously determined for each contact state a point belongs. The point is determined by moving amounts of the left and right front sensors in a vehicle width direction.

SUMMARY

An aspect of the disclosure provides a contact state determination apparatus to be applied to a vehicle. The vehicle includes a vehicle compartment and right and left frames in a pair protruding forward of the vehicle from a front end part of the vehicle compartment. The contact state determination apparatus includes right and left frame lateral acceleration sensors, a vehicle compartment acceleration sensor, and a contact state determination processor. The right and left frame lateral acceleration sensors are disposed respectively on the right and left frames. The right and left frame lateral acceleration sensors are configured to detect respective lateral acceleration rates. The vehicle compartment acceleration sensor is disposed in the vehicle compartment and is configured to detect a longitudinal acceleration rate. The contact state determination processor is configured to determine a contact state of the vehicle, based on outputs of the right and left frame lateral acceleration sensors and the vehicle compartment acceleration sensor. The contact state determination processor is configured to determine that the contact state is an oblique contact when: the right and left frame lateral acceleration sensors detect the lateral acceleration rates that are in a same direction and are greater than or equal to a predetermined value; and the longitudinal acceleration rate detected by the vehicle compartment acceleration sensor or an integrated value of the longitudinal acceleration rate is greater than or equal to a predetermined oblique contact determination value.

An aspect of the disclosure provides a contact state determination apparatus to be applied to a vehicle. The vehicle includes a vehicle compartment and right and left frames in a pair protruding forward of the vehicle from a front end part of the vehicle compartment. The contact state determination apparatus includes right and left frame lateral acceleration sensors, a vehicle compartment acceleration sensor, and a contact state determination processor. The right and left frame lateral acceleration sensors are disposed respectively on the right and left frames. The right and left frame lateral acceleration sensors are configured to detect respective lateral acceleration rates. The vehicle compartment acceleration sensor is disposed in the vehicle compartment and is configured to detect a longitudinal acceleration rate. The contact state determination processor is configured to determine a contact state of the vehicle, based on outputs of the right and left frame lateral acceleration sensors and the vehicle compartment acceleration sensor. The contact state determination processor is configured to determine that the contact state is a small overlap offset contact when: the right and left frame lateral acceleration sensors detect the lateral acceleration rates that are in a same direction and are greater than or equal to a predetermined value; and the longitudinal acceleration rate detected by the vehicle compartment acceleration sensor or an integrated value of the longitudinal acceleration rate is less than a predetermined small overlap offset contact determination value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
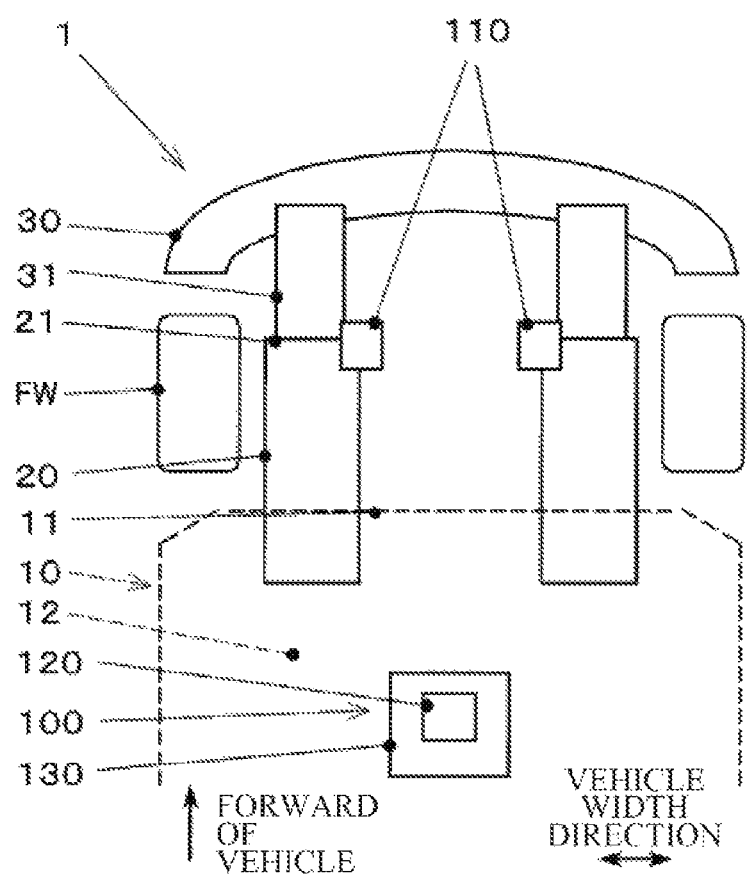
FIG. 1 is a schematic diagram illustrating a structure of a front part of a body of a vehicle including a contact state determination apparatus according to one example embodiment of the disclosure.

For example, there is a demand for improving a sensing capability to detect a contact of a vehicle to appropriately control an occupant protection apparatus such as an airbag device.

Sensing of a contact is difficult in contact states in which an impact in a vehicle width direction (lateral direction)

occurs in addition to an impact in a front-rear direction, that is, in contact states that involve a yawing behavior of a vehicle body.

For example, it is difficult to distinguish between a small overlap contact and an oblique contact. The small overlap contact is a contact on a part outward of a front side frame. The oblique contact is a contact from obliquely front on half or less than half the width of a vehicle. The small overlap contact and the oblique contact are similar contact states except that a range in which a contact object overlaps an own vehicle in the vehicle width direction differs from each other.

Given the circumstances, the number of acceleration sensors or other sensors provided on parts of a vehicle body may be increased as a countermeasure. This complicates a configuration of a device and increases costs.

It is desirable to provide a contact state determination apparatus that makes it possible to appropriately determine a contact state of a vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In the following, a description is given of a contact state determination apparatus 100 according to an example embodiment of the disclosure.

The contact state determination apparatus 100 according to the example embodiment may be mounted on a vehicle, for example, an automobile such as a passenger car. The contact state determination apparatus 100 may control, for example, an occupant protection apparatus (occupant restraint device) such as an airbag device.

FIG. 1 is a diagram schematically illustrating a structure of a front part of a body of a vehicle 1 that includes the contact state determination apparatus 100 according to the example embodiment.

The vehicle 1 may include, for example, a vehicle compartment 10, front side frames 20, and a bumper beam 30. The vehicle 1 may also be referred to as an own vehicle. In one embodiment, the front side frames 20 may serve as a "right and left frames in a pair".

The vehicle compartment 10 may define a space in which, for example, an occupant, etc. is accommodated.

The vehicle compartment 10 may include a toe board 11 provided in a front end part. The toe board 11 may be a partition that separates the vehicle compartment 10 from an engine compartment. The engine compartment may be a space in which a non-illustrated power unit is accommodated.

A floor panel 12 configuring a floor of the vehicle compartment 10 may be provided to protrude rearward of the vehicle 1 from a lower end part of the toe board 11.

The front side frames 20 may be beam-shaped members provided to protrude forward of the vehicle 1 from the front end part of the vehicle compartment 10.

The front side frames 20 may extend along a front-rear direction of the vehicle 1 with the engine compartment in between.

The front side frames 20 may have, for example, a rectangular closed section along a plane orthogonal to the front-rear direction of the vehicle 1.

The front side frames 20 may be a base to which, for example, a suspension cross member or a strut tower is mounted. The suspension cross member may be a front suspension mount on a vehicle.

The suspension cross member may receive mounts that support the power unit such as an engine.

Each of the front side frames 20 may have a front end part 21. The front end part 21 may protrude forward of the vehicle 1 from the toe board 11.

Each of the front side frames 20 may have a rear end part. The rear end part may extend below the lower end part of the toe board 11 and may be disposed along the bottom face of the floor panel 12.

Left and right front wheels FW may each be disposed outward of a middle part of the corresponding one of the front side frames 20 in a vehicle width direction.

The vehicle compartment 10 and the front side frames 20 may be configured as members of a white body as a result of integration of panels and joining of the panels by a method such as spot welding or laser welding. The panels may be pressed steel plates such as general steel or high tensile strength steel. The white body may refer to a body shell or a vehicle body before it is outfitted.

The bumper beam 30 may be a beam-shaped member extending in the vehicle width direction and may be mounted on the front end parts 21 of the front side frames 20 on the left and right sides using bumper beam stays 31. Hereinafter, the front side frames 20 may also be referred to as left and right front side frames 20.

The bumper beam 30 may so curve, for example, into an arc-shape as to protrude forward in plan view as seen from above the vehicle 1.

The intermediate part of the bumper beam 30 in the vehicle width direction may extend between the front end parts 21 of the left and right front side frames 20.

Side ends of the bumper beam 30 may each protrude outward of the corresponding one of the left and right front side frames 20 in the vehicle width direction.

The side ends of the bumper beam 30 may be disposed forward of the front wheels FW.

A non-illustrated bumper face may be provided forward of the bumper beam 30.

The bumper face may be an exterior member including a material such as a resin-based material. The bumper face may also be a design member configuring a part of an exterior surface of the vehicle body.

The bumper beam 30 may receive a load to be applied from a contact object O (refer to, for example, FIG. 3) via the bumper face upon a frontal contact of the vehicle 1.

The bumper beam 30 may be, for example, panels integrated and joined by a method such as welding. The panels may be a pressed material such as steel plates. Alternatively, the bumper beam 30 may include, for example, an aluminum-based alloy extrusion material.

The contact state determination apparatus 100 according to the example embodiment includes, for example, frame sensors 110, an electronic control unit (ECU) sensor 120, and an airbag ECU 130.

The frame sensors 110 may be acceleration sensors each provided on the corresponding one of the left and right front side frames 20. The frame sensors 110 may also be referred to as a left frame sensor 110 and a right frame sensor 110.

The positions of the frame sensors 110 in the vehicle front-rear direction may be, for example, immediately rear of the front end parts 21 of the front side frames 20.

The frame sensors 110 may detect an acceleration rate Gxl (left side) and an acceleration rate Gxr (right side) in the front-rear direction, that is, the longitudinal acceleration rate Gxl (left side) and the longitudinal acceleration rate Gxr (right side). The frame sensors 110 may detect an acceleration rate Gyl (left side) and an acceleration rate Gyr (right side) in the vehicle width direction (left-right direction), that is, the lateral acceleration rate Gyl (left side) and the lateral acceleration rate Gyr (right side).

In one embodiment, the frame sensors 110 may serve as a "frame lateral acceleration sensor" and a "frame longitudinal acceleration sensor".

The ECU sensor 120 may be an acceleration sensor included in the airbag ECU 130.

The ECU sensor 120 detects an acceleration rate Gxc in the front-rear direction that acts on the vehicle compartment 10, that is, the longitudinal acceleration rate Gxc.

In one embodiment, the ECU sensor 120 may serve as a "vehicle compartment acceleration sensor".

The airbag ECU 130 (airbag control unit) may be a processor that controls to deploy airbags in non-illustrated airbag devices that restrain and protect an occupant upon a contact of the vehicle 1.

The airbag ECU 130 may be mounted on, for example, a middle part of an upper surface of the floor panel 12 in the vehicle compartment 10.

Each airbag device may include, for example, an airbag and a gas generator that supplies deployment gas to the airbag. The airbag may include base fabric panels including fabric such as nylon-based fibers.

The airbag may be accommodated in an interior member in a folded state during normal use of the vehicle 1.

The gas generator may start generating the deployment gas in response to a command from the airbag ECU 130 and may deploy the airbag in the vehicle compartment 10 to restrain a non-illustrated occupant.

The airbag ECU 130 may include, for example, data processor such as a central processing unit (CPU), a storage such as a random access memory (RAM) or a read only memory ROM, an input/output interface, a bus that couples these components, etc.

The airbag ECU 130 may include the above-described ECU sensor 120.

In one embodiment, the airbag ECU 130 may serve as a "contact state determination processor".

Figure 2:
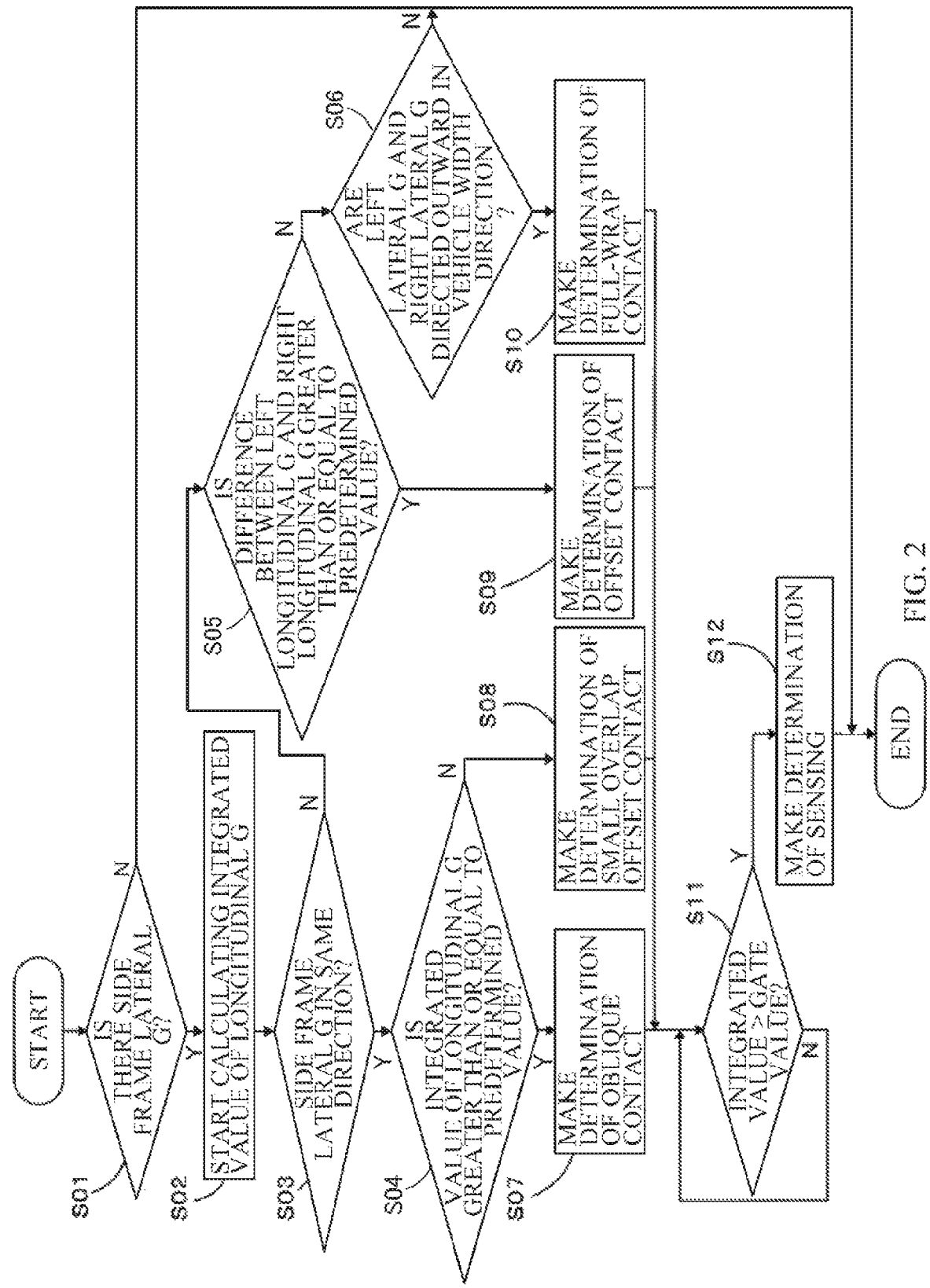
FIG. 2 is a flowchart illustrating an operation of the contact state determination apparatus illustrated in FIG. 1.

FIG. 2 is a flowchart illustrating an operation of the contact state determination apparatus 100 according to the example embodiment.

In the following, a description is given in the order of steps.

[Step S01: Determination of Frame Sensor Lateral Acceleration Rate]

The airbag ECU 130 may determine whether the frame sensor 110 has detected the lateral acceleration rate Gyl or the lateral acceleration rate Gyr greater than or equal to a predetermined value (threshold).

The predetermined value may be a threshold that triggers an activation of a contact detection logic. The predetermined value may be set to be, for example, greater than the lateral acceleration rate Gyl and the lateral acceleration rate Gyr that may occur during normal traveling of the vehicle 1.

If one or both of the left and right frame sensors 110 have detected the lateral acceleration rate Gyl and the lateral acceleration rate Gyr that are greater than or equal to the predetermined value (step S01: Y), the airbag ECU 130 may cause the flow to proceed to step S02. Otherwise (step S01: N), the airbag ECU 130 may end the series of processes or make a return.

[Step S02: Start Calculating Integrated Value of Longitudinal G]

The airbag ECU 130 may start integrating the detection values of the longitudinal acceleration rate Gxc detected by the ECU sensor 120.

One reason for this is that the integrated value is used to determine the occurrence of a contact of the vehicle 1 and determining the contact state, because the airbag ECU 130 is disposed in the vehicle compartment 10, and accordingly example effects such as energy absorption (EA) by crushing of the front side frames 20 lower an instantaneous value of the acceleration rate and make it difficult to determine the occurrence of a contact of the vehicle 1 based on the acceleration rate itself.

Thereafter, the airbag ECU 130 may cause the flow to proceed to step S03.

[Step S03: Determination of Side Frame Lateral G]

The airbag ECU 130 may determine whether the lateral acceleration rate Gyl detected by the left frame sensor 110 and the lateral acceleration rate Gyr detected by the right frame sensor 110 are in the same direction.

If the lateral acceleration rate Gyl and the lateral acceleration rate Gyr are in the same direction (step S03: Y), the contact of the vehicle 1 is suspected to be an oblique contact or a small overlap offset contact. In this case, the airbag ECU 130 may cause the flow to proceed to step S04. Otherwise (step S03: N), the airbag ECU 130 may cause the flow to proceed to step S05.

[Step S04: Determination of Integrated Value of Longitudinal G]

After starting calculation at step S02, the airbag ECU 130 may compare the integrated value of the longitudinal acceleration rate Gxc up to a point in time when a predetermined time has elapsed with an oblique contact determination value. The oblique contact determination value may be a predetermined threshold. In this case, the predetermined threshold may also serve as a small overlap offset contact determination value.

If the integrated value of the longitudinal acceleration rate is greater than or equal to the oblique contact determination value (step S04: Y), the airbag ECU 130 may cause the flow to proceed to step S07.

If the integrated value of the longitudinal acceleration rate is less than the oblique contact determination value, that is, the small overlap offset contact determination value (step S04: N), the airbag ECU 130 may cause the flow to proceed to step S08.

[Step S05: Determination of Difference Between Left Longitudinal G and Right Longitudinal G]

The airbag ECU 130 may compare the longitudinal acceleration rate Gxl detected by the left frame sensor 110 with the longitudinal acceleration rate Gxr detected by the right frame sensor 110 and may determine whether there is a difference greater than or equal to a predetermined threshold.

If there is a difference greater than or equal to the threshold between the longitudinal acceleration rate Gxl and the longitudinal acceleration rate Gxr (step S05: Y), the airbag ECU 130 may cause the flow to proceed to step S09. This may also include a case in which one of the longitudinal acceleration rate Gxl and the longitudinal acceleration rate Gxr is very small, substantially zero, or undetectable. Otherwise (step S05: N), the airbag ECU 130 may cause the flow to proceed to step S06.

[Step S06: Determination of Left Lateral Acceleration Rate and Right Lateral Acceleration Rate]

The airbag ECU 130 may determine whether the lateral acceleration rate Gyl detected by the left frame sensor 110 and the lateral acceleration rate Gyr detected by the right frame sensor 110 are in opposite directions, that is, directed outward in the vehicle width direction.

If the lateral acceleration rate Gyl and the lateral acceleration rate Gyr are in the opposite directions and outward in the vehicle width direction and are each greater than or equal to a predetermined value (step S06: Y), the airbag ECU 130 may cause the flow to proceed to step S10. Otherwise (step S06: N), the airbag ECU 130 may determine that the contact state is highly possibly other than those distinguishable by the above logic and may end the series of processes.

[Step S07: Making Determination of Oblique Contact]

The airbag ECU 130 makes a determination of an oblique contact.

Figure 3:
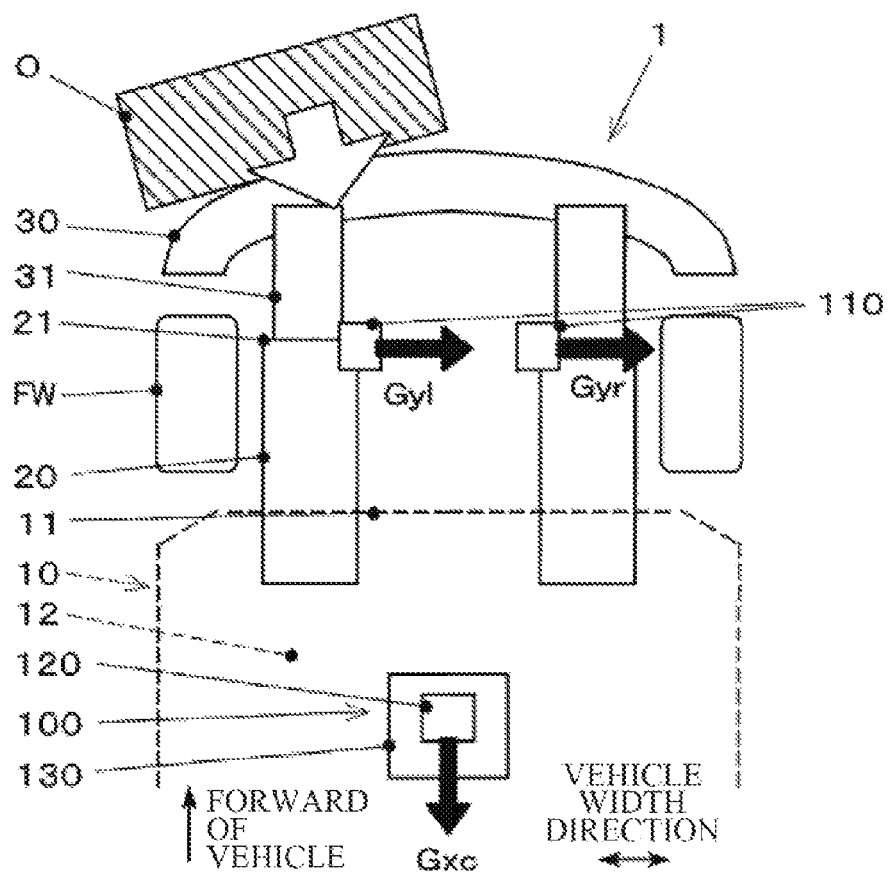
FIG. 3 is a diagram illustrating a state of a case in which an oblique contact of the vehicle illustrated in FIG. 1 occurs.

FIG. 3 is a diagram illustrating a state of a case in which an oblique contact of the vehicle 1 according to the example embodiment occurs.

The oblique contact may be a contact state of the own vehicle 1 in which, for example, the contact object O such as another vehicle contacts the front part of the own vehicle 1 from obliquely front by an overlap rate of half or less than half the width of the vehicle 1.

The position of the contact object O may overlap with one or both of the front side frames 20 in the vehicle width direction of the own vehicle 1.

In this case, the left and right frame sensors 110 may detect the lateral acceleration rate Gyl and the lateral acceleration rate Gyr in the same direction, that is, generally in the direction opposite to the point of contact.

The integrated value of the longitudinal acceleration rate Gxc detected by the ECU sensor 120 may be greater than that in a case of a small overlap offset contact, which will be described later.

Thereafter, the airbag ECU 130 may cause the flow to proceed to step S11.

[Step S08: Making Determination of Small Overlap Offset Contact]

The airbag ECU 130 makes a determination of a small overlap offset contact.

Figure 4:
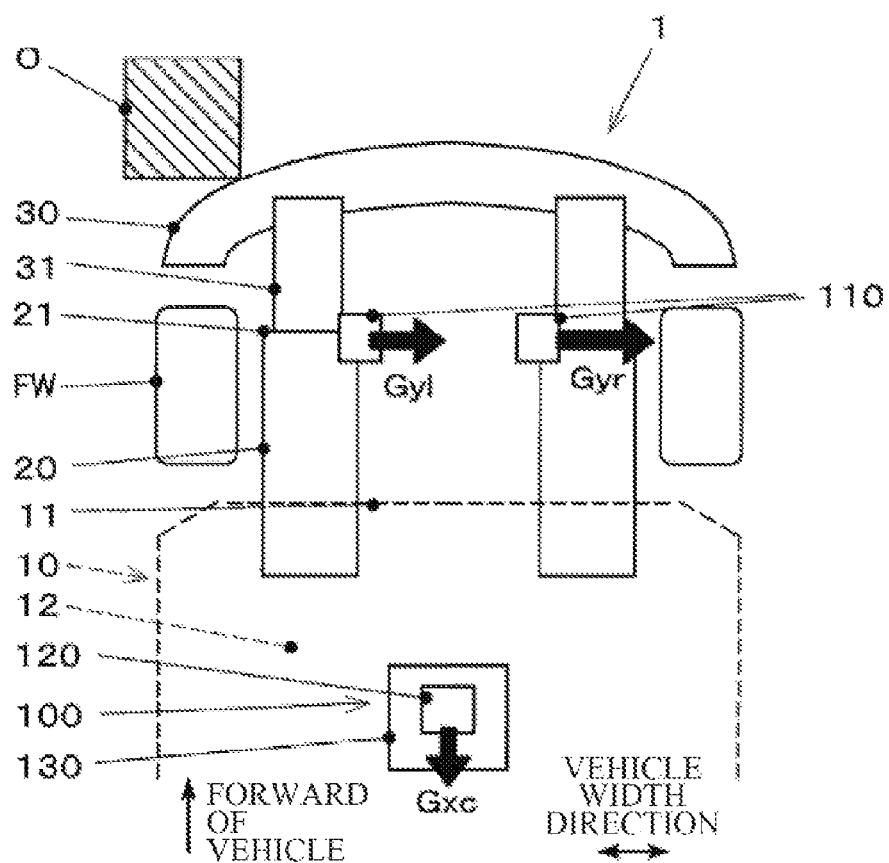
FIG. 4 is a diagram illustrating a state of a case in which a small overlap offset contact of the vehicle illustrated in FIG. 1 occurs.

FIG. 4 is a diagram illustrating a state of a case in which a small overlap offset contact of the vehicle 1 according to the example embodiment occurs.

The small overlap offset contact may be a contact state in which the contact object O contacts the own vehicle 1 from the front of the own vehicle 1 at a local region outward of one of the front side frames 20 in the vehicle width direction.

In this case, the left and right frame sensors 110 may detect the lateral acceleration rate Gyl and the lateral acceleration rate Gyr in the same direction, that is, generally in the direction opposite to the point of contact.

The integrated value of the longitudinal acceleration rate Gxc detected by the ECU sensor 120 may be relatively smaller than that in a case of the above-described oblique contact.

Thereafter, the airbag ECU 130 may cause the flow to proceed to step S11.

[Step S09: Making Determination of Offset Contact]

The airbag ECU 130 may make a determination of an offset contact, that is, a non-small overlap.

Figure 5:
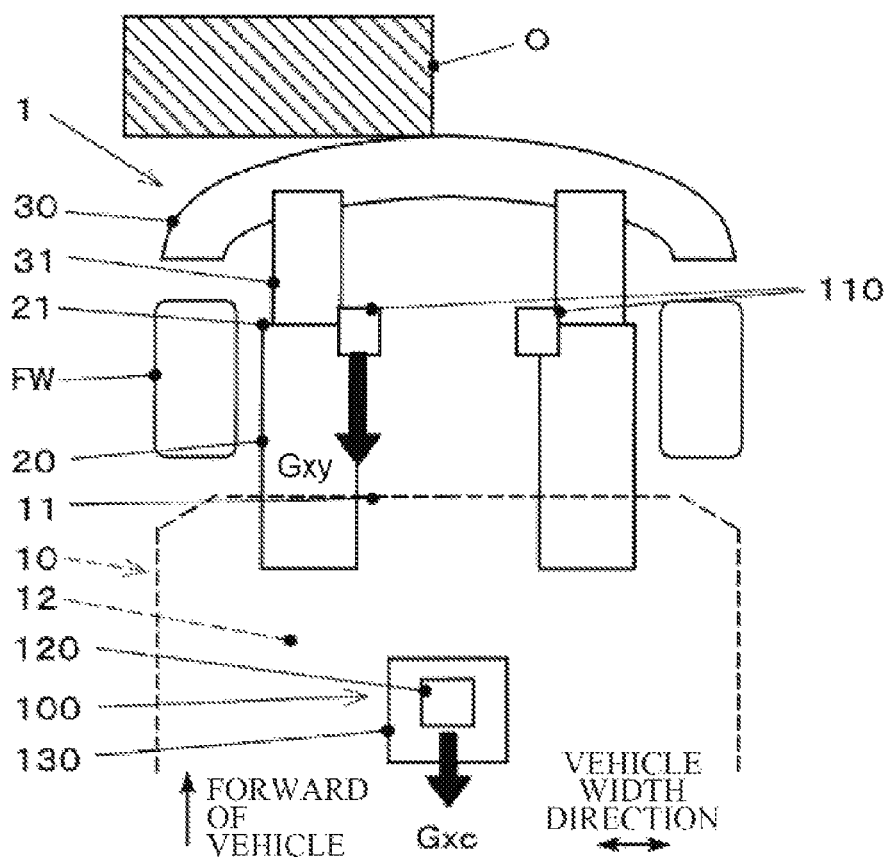
FIG. 5 is a diagram illustrating a state of a case in which an offset contact of the vehicle illustrated in FIG. 1 occurs.

FIG. 5 is a diagram illustrating a state of a case in which an offset contact of the vehicle 1 according to the example embodiment occurs.

The offset contact may be a contact state in which the contact object O contacts the own vehicle 1 from the front of the own vehicle 1 in such a manner that the contact object O overlaps with one of the left and right front side frames 20 in the vehicle width direction.

In this case, the frame sensor 110 closer to the point of contact (on the left in this example) may detect a significant longitudinal acceleration rate Gxy. However, the frame sensor 110 farther from the point of contact may detect a very small longitudinal acceleration rate Gxr.

Additionally, the ECU sensor 120 may detect the longitudinal acceleration rate Gxc.

Thereafter, the airbag ECU 130 may cause the flow to proceed to step S11.

[Step S10: Making Determination of Full-Wrap Contact]

The airbag ECU 130 may make a determination of a full-wrap contact.

Figure 6:
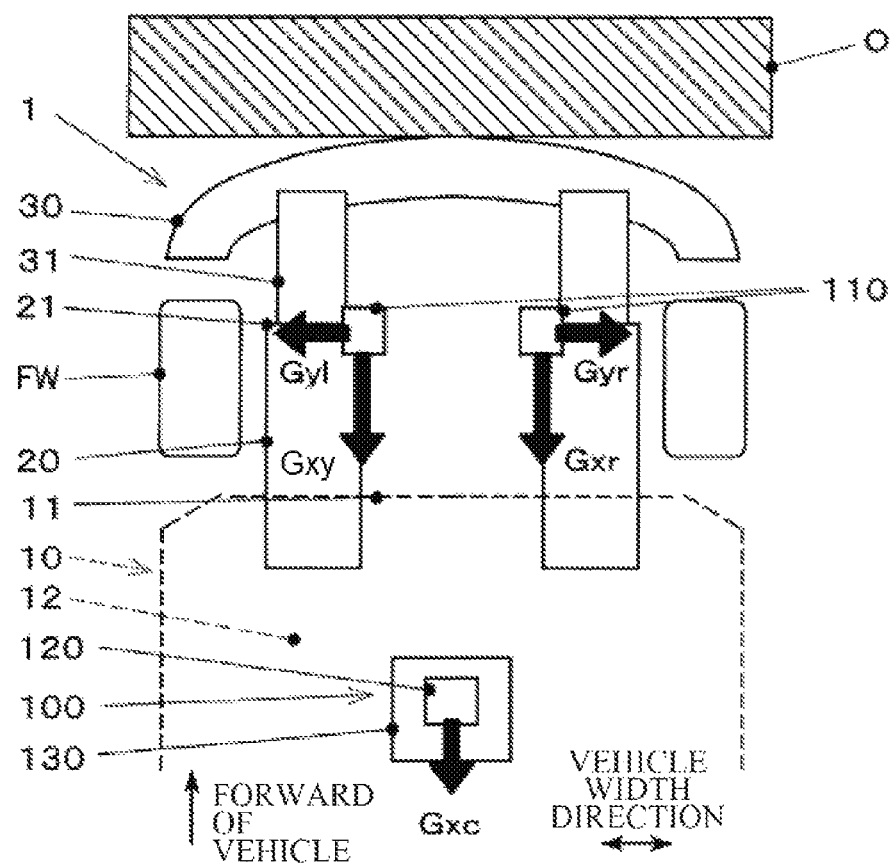
FIG. 6 is a diagram illustrating a state of a case in which a full-wrap contact of the vehicle illustrated in FIG. 1 occurs.

FIG. 6 is a diagram illustrating a state of a case in which a full-wrap contact of the vehicle 1 according to the example embodiment occurs.

The full-wrap contact may be a contact state in which the contact object O contacts the own vehicle 1 from the front of the own vehicle 1 in such a manner that the contact object O overlaps with both the left and right front side frames 20 in the vehicle width direction.

In this case, the left and right frame sensors 110 may detect the lateral acceleration rate Gyl and the lateral acceleration rate Gyr in the left and right opposite directions (outward in the vehicle width direction) and may also detect the longitudinal acceleration rate Gxy and the longitudinal acceleration rate Gxr.

Additionally, the ECU sensor 120 may detect a relatively large longitudinal acceleration rate Gxc.

Thereafter, the airbag ECU 130 may cause the flow to proceed to step S11.

[Step S11: Comparing Integrated Value of Longitudinal Acceleration Rate with Gate Value]

The airbag ECU 130 may compare the integrated value of the longitudinal acceleration rate Gxc the calculation of which has started at step S02 with a predetermined integrated value sensing gate (threshold).

Figure 7:
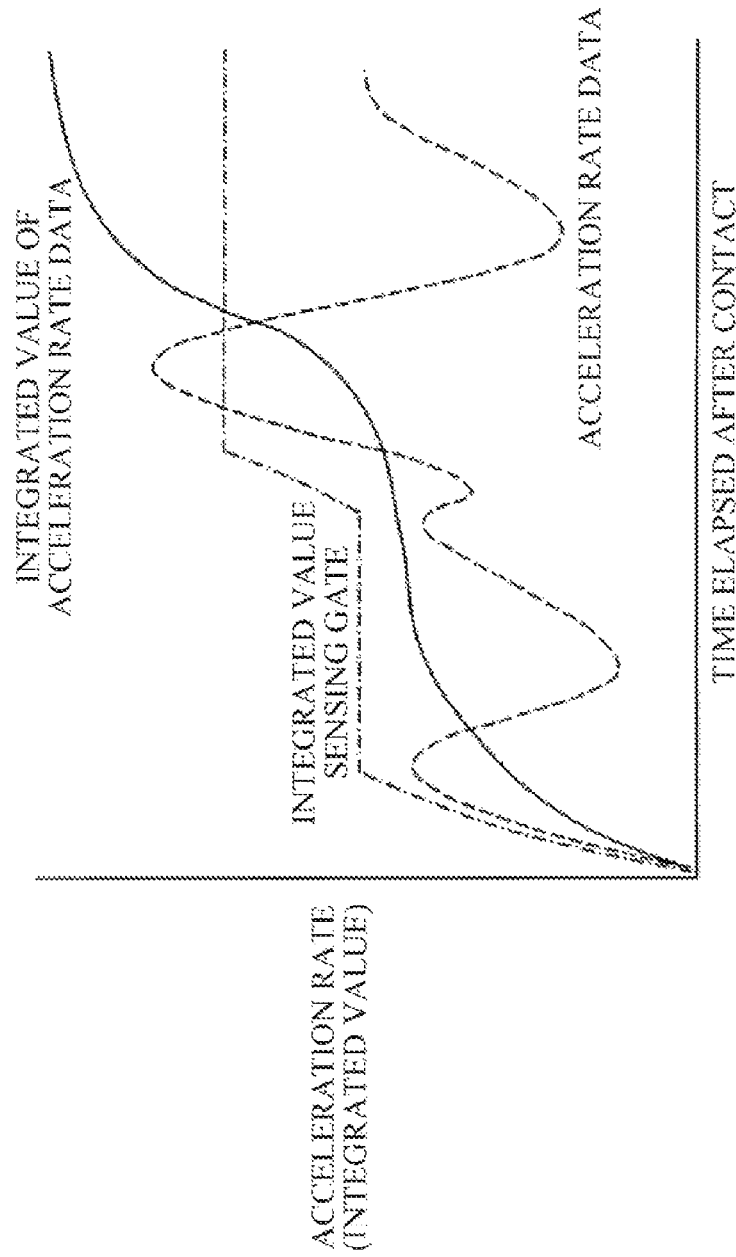
FIG. 7 is a graph illustrating an example of a relationship between an elapsed time after contact and acceleration rate data and between the elapsed time and an integrated value of the acceleration rate data.

FIG. 7 is a graph illustrating an example of a relationship between an elapsed time after contact and acceleration rate data and between the elapsed time and an integrated value of the acceleration rate data.

In FIG. 7, the horizontal axis indicates the time elapsed from when a contact of the vehicle 1 occurred, whereas the vertical axis indicates the longitudinal acceleration rate detected by the ECU sensor 120, the integrated value of the longitudinal acceleration rate, and the integrated value sensing gate. The integrated value sensing gate may be a threshold set with respect to the integrated value.

As illustrated in FIG. 7, the longitudinal acceleration rate fluctuates greatly in accordance with, for example, which part of the vehicle body the crushing (energy absorption) is taking place, and the detection value itself is relatively small.

For this reason, the integrated value of the longitudinal acceleration rate may be compared with the integrated value sensing gate to perform sensing of a contact of the vehicle 1.

The integrated value sensing gate may be increased step by step in accordance with, for example, the increase in the elapsed time from when the contact has occurred.

If the integrated value exceeds the integrated value sensing gate (step S11: Y), the airbag ECU 130 may cause the flow to proceed to step S12. Otherwise (step S11: N), the airbag ECU 130 may repeat step S11.

[Step S12: Making Determination of Sensing]

The airbag ECU 130 may make a determination that a contact has been detected, or that the airbag has to be deployed, and may output a deployment command to the airbag device at a position corresponding to the determined contact state at a predetermined sensing time. The predetermined sensing time may be a point in time at which the airbag is started to be deployed.

This may activate the gas generator that supplies deployment gas to the airbag, causing the airbag to be deployed.

Thereafter, the airbag ECU 130 may end the series of processes.

According to the example embodiments described above, it is possible to achieve at least one of the following example effects.

(1) The oblique contact is determined in accordance with the detection of the lateral acceleration rate Gyl and the lateral acceleration rate Gyr of the left and right front side frames 20 that are greater than or equal to the predetermined value and in the same direction and the longitudinal acceleration rate Gxc in the vehicle compartment 10 that is greater than or equal to the oblique contact determination threshold. This helps to appropriately determine the oblique contact that is difficult to be distinguished from the small overlap offset contact.

(2) The small overlap offset contact may be determined in accordance with the detection of the lateral acceleration rate Gyl and the lateral acceleration rate Gyr of the left and right front side frames 20 that are greater than or equal to the predetermined value and in the same direction and the longitudinal acceleration rate Gxc in the vehicle compartment 10 that is less than the small overlap offset contact determination value. This helps to appropriately determine the small overlap offset contact that is difficult to be distinguished from the oblique contact.

(3) The full-wrap contact may be determined in accordance with the detection of the lateral acceleration rate Gyl and the lateral acceleration rate Gyr of the left and right front side frames 20 in the direction outward in the vehicle width direction. This makes it possible to appropriately determine the full-wrap contact.

(4) The offset contact may be determined when the difference between the longitudinal acceleration rate Gxl and the longitudinal acceleration rate Gxr of the left and right front side frames 20 is great. Typically, the offset contact may be determined when one of the longitudinal acceleration rate Gxl and the longitudinal acceleration rate Gxr is very small or undetectable. This makes it possible to appropriately determine the offset contact.

As described above, according to one or more embodiments of the disclosure, it is possible to provide a contact state determination apparatus that is able to appropriately determine a contact state of a vehicle.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof (1) The configurations of the contact state determination apparatus and the vehicle are not limited to those in the example embodiments described above and may be changed as appropriate.

(2) The structure of the body of the vehicle and the positions of the sensors are examples and may be changed as appropriate. In some embodiments, a member that configures the vehicle body or sensors other than those described in the example embodiments may further be added.

(3) In the example embodiments, the acceleration in the vehicle compartment may be detected by the ECU sensor included in the airbag ECU. In some embodiments, the acceleration in the vehicle compartment may be detected by a sensor provided independently from, for example, the ECU. The position where such a sensor is mounted is not limited to a particular position as long as it is a part configuring the vehicle compartment.

(4) In the example embodiments, for example, the contact state may be determined using the integrated value of the acceleration rate in the vehicle compartment. However, an embodiment of the disclosure is not limited thereto. In some embodiments, the contact state may be determined using an instantaneous value (e.g., a maximum value) of the acceleration rate in the vehicle compartment.

(5) In the example embodiments, the lateral acceleration rate and the longitudinal acceleration rate may be detected using a single frame sensor. In some embodiments, sensors that detect the lateral acceleration rate and the longitudinal acceleration rate may be independently provided.

As used herein, the term "collision" may be used interchangeably with the term "contact". The airbag ECU 130 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag ECU 130 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag ECU 130 illustrated in FIG. 1.

The invention claimed is:

1. A contact state determination apparatus to be applied to a vehicle, the vehicle comprising a vehicle compartment and right and left frames in a pair protruding forward of the vehicle from a front end part of the vehicle compartment, the contact state determination apparatus comprising:
- right and left frame lateral acceleration sensors disposed respectively on right and left frames, the right and left frame lateral acceleration sensors being configured to detect respective lateral acceleration rates;
- a vehicle compartment acceleration sensor disposed in the vehicle compartment and configured to detect a longitudinal acceleration rate; and
- a contact state determination processor configured to determine a contact state of the vehicle, based on outputs of the right and left frame lateral acceleration sensors and the vehicle compartment acceleration sensor, wherein the contact state determination processor is configured to:
- determine whether at least one of detected values of the first and second lateral acceleration rates becomes equal to or greater than a first threshold value;
- upon determining that the at least one of the detected values of the first and second lateral acceleration rates becomes equal to or greater than the first threshold value, start integrating detected values of the longitudinal acceleration rate, and determine whether the detected values of the first and second lateral acceleration rates are in a same direction;
- determine whether an integrated value of the longitudinal acceleration rate, calculated up to a predetermined time point, is equal to or greater than a second threshold value that is different from the first threshold value;
- upon determining that the detected values of the first and second lateral acceleration rates are in the same direction and the integrated value of the longitudinal acceleration rate is equal to or greater than the second threshold value, determine that an oblique contact has occurred between the vehicle and an object;
- upon determining that the oblique contact has occurred, determine whether the integrated value of the longitudinal acceleration rate is equal to or greater than a third threshold value that is different from the first and second threshold values; and
- upon determining that the integrated value of the longitudinal acceleration rate is equal to or greater than the third threshold value, output an airbag deployment command to activate an airbag device corresponding to the detected oblique contact.

2. The contact state determination apparatus according to claim 1, wherein the contact state determination processor is configured to:
- upon determining that the detected values of the first and second lateral acceleration rates are in the same direction and the integrated value of the longitudinal acceleration rate is less than the second threshold value, determine that a small overlap offset contact has occurred between the vehicle and an object;
- upon determining that the small overlap offset contact has occurred, determine whether the integrated value of the longitudinal acceleration rate is equal to or greater than the third threshold value; and
- upon determining that the integrated value of the longitudinal acceleration rate is equal to or greater than the third threshold value, output an airbag deployment command to activate an airbag device corresponding to the detected small overlap offset contact.

3. The contact state determination apparatus according to claim 2, wherein the contact state determination processor is configured to:
- upon determining that the detected values of the first and second lateral acceleration rates are not in the same direction, but are in opposite directions, each directed outward in a vehicle width direction, determine that a full-wrap contact has occurred between the vehicle and an object;
- upon determining that the full-wrap contact has occurred, determine whether the integrated value of the longitudinal acceleration rate is equal to or greater than the third threshold value; and
- upon determining that the integrated value of the longitudinal acceleration rate is equal to or greater than the third threshold value, output an airbag deployment command to activate an airbag device corresponding to the detected full-wrap contact.

4. The contact state determination apparatus according to claim 2, further comprising a right frame longitudinal acceleration sensor and a left frame longitudinal acceleration sensor disposed respectively on the right and left frames, the right frame longitudinal acceleration sensor and the left frame longitudinal acceleration sensor being configured to detect a right frame longitudinal acceleration rate and a left frame longitudinal acceleration rate, respectively,
wherein the contact state determination processor is configured to:
- upon determining that the detected values of the first and second lateral acceleration rates are not in the same direction, but a difference between a detected value of the right frame longitudinal acceleration rate and a detected value of the left frame longitudinal acceleration rate are equal to or greater than a fourth threshold value that is different from the first to third threshold, determine that an offset contact has occurred between the vehicle and an object;
- upon determining that the offset contact has occurred, determine whether the integrated value of the longitudinal acceleration rate is equal to or greater than the third threshold value; and
- upon determining that the integrated value of the longitudinal acceleration rate is equal to or greater than the third threshold value, output an airbag deployment command to activate an airbag device corresponding to the detected offset contact.

5. The contact state determination apparatus according to claim 1, wherein the contact state determination processor is configured to:
- upon determining that the detected values of the first and second lateral acceleration rates are not in the same direction, but are in opposite directions, each directed outward in a vehicle width direction, determine that a full-wrap contact has occurred between the vehicle and an object;
- upon determining that the full-wrap contact has occurred, determine whether the integrated value of the longitudinal acceleration rate is equal to or greater than the third threshold value; and
- upon determining that the integrated value of the longitudinal acceleration rate is equal to or greater than the third threshold value, output an airbag deployment command to activate an airbag device corresponding to the detected full-wrap contact.

6. The contact state determination apparatus according to claim 1, further comprising a right frame longitudinal acceleration sensor and a left frame longitudinal acceleration sensor disposed respectively on the right and left frames, the right frame longitudinal acceleration sensor and the left frame longitudinal acceleration sensor being configured to detect a right frame longitudinal acceleration rate and a left frame longitudinal acceleration rate, respectively, wherein the contact state determination processor is configured to:

upon determining that the detected values of the first and second lateral acceleration rates are not in the same direction, but a difference between a detected value of the right frame longitudinal acceleration rate and a detected value of the left frame longitudinal acceleration rate are equal to or greater than a fourth threshold value that is different from the first to third threshold, determine that an offset contact has occurred between the vehicle and an object;

upon determining that the offset contact has occurred, determine whether the integrated value of the longitudinal acceleration rate is equal to or greater than the third threshold value; and upon determining that the integrated value of the longitudinal acceleration rate is equal to or greater than the third threshold value, output an airbag deployment command to activate an airbag device corresponding to the detected offset contact.

7. A contact state determination apparatus to be applied to a vehicle, the vehicle comprising a vehicle compartment and right and left frames in a pair protruding forward of the vehicle from a front end part of the vehicle compartment, the contact state determination apparatus comprising:

right and left frame lateral acceleration sensors disposed respectively on the right and left frames, the right and left frame lateral acceleration sensors being configured to detect respective lateral acceleration rates;

a vehicle compartment acceleration sensor disposed in the vehicle compartment and configured to detect a longitudinal acceleration rate; and a contact state determination processor configured to determine a contact state of the vehicle, based on outputs of the right and left frame lateral acceleration sensors and the vehicle compartment acceleration sensor, wherein the contact state determination processor is configured to:

determine whether at least one of detected values of the first and second lateral acceleration rates becomes equal to or greater than a first threshold value;

upon determining that the at least one of the detected values of the first and second lateral acceleration rates becomes equal to or greater than the first threshold value, start integrating detected values of the longitudinal acceleration rate, and determine whether the detected values of the first and second lateral acceleration rates are in a same direction;

determine whether an integrated value of the longitudinal acceleration rate, calculated up to a predetermined time point, is equal to or greater than a second threshold value that is different from the first threshold value;

upon determining that the detected values of the first and second lateral acceleration rates are in the same direction and the integrated value of the longitudinal acceleration rate is less than the second threshold value, determine that a small overlap offset contact has occurred between the vehicle and an object;

upon determining that the small overlap offset contact has occurred, determine whether the integrated value of the longitudinal acceleration rate is equal to or greater than a third threshold value that is different from the first and second threshold values; and upon determining that the integrated value of the longitudinal acceleration rate is equal to or greater than the third threshold value, output an airbag deployment command to activate an airbag device corresponding to the detected small overlap offset contact.

8. The contact state determination apparatus according to claim 7, wherein the contact state determination processor is configured to:

upon determining that the detected values of the first and second lateral acceleration rates are not in the same direction, but are in opposite directions, each directed outward in a vehicle width direction, determine that a full-wrap contact has occurred between the vehicle and an object;

upon determining that the full-wrap contact has occurred, determine whether the integrated value of the longitudinal acceleration rate is equal to or greater than the third threshold value; and upon determining that the integrated value of the longitudinal acceleration rate is equal to or greater than the third threshold value, output an airbag deployment command to activate an airbag device corresponding to the detected full-wrap contact.

9. The contact state determination apparatus according to claim 7, further comprising a right frame longitudinal acceleration sensor and a left frame longitudinal acceleration sensor disposed respectively on the right and left frames, the right frame longitudinal acceleration sensor and the left frame longitudinal acceleration sensor being configured to detect a right frame longitudinal acceleration rate and a left frame longitudinal acceleration rate, respectively, wherein the contact state determination processor is configured to:

upon determining that the detected values of the first and second lateral acceleration rates are not in the same direction, but a difference between a detected value of the right frame longitudinal acceleration rate and a detected value of the left frame longitudinal acceleration rate are equal to or greater than a fourth threshold value that is different from the first to third threshold, determine that an offset contact has occurred between the vehicle and an object;

upon determining that the offset contact has occurred, determine whether the integrated value of the longitudinal acceleration rate is equal to or greater than the third threshold value; and upon determining that the integrated value of the longitudinal acceleration rate is equal to or greater than the third threshold value, output an airbag deployment command to activate an airbag device corresponding to the detected offset contact.

10. A contact state determination apparatus to be applied to a vehicle, the vehicle comprising a vehicle compartment and right and left frames in a pair protruding forward of the vehicle from a front end part of the vehicle compartment, the contact state determination apparatus comprising:

a right frame lateral acceleration sensor and a left frame lateral acceleration sensor disposed respectively on the right and left frames, the right frame lateral acceleration sensor and the left frame lateral acceleration sensor being configured to detect a right frame lateral acceleration rate and a left frame lateral acceleration rate, respectively;

a right frame longitudinal acceleration sensor and a left frame longitudinal acceleration sensor disposed respectively on the right and left frames, the right frame longitudinal acceleration sensor and the left frame longitudinal acceleration sensor being configured to detect a right frame longitudinal acceleration rate and a left frame longitudinal acceleration rate, respectively;

a vehicle compartment acceleration sensor disposed in the vehicle compartment and configured to detect a longitudinal acceleration rate; and a contact state determination processor configured to determine a contact state of the vehicle, based on outputs of the right and left frame lateral acceleration sensors and the vehicle compartment acceleration sensor, wherein the contact state determination processor is configured to:
determine whether at least one of detected values of the first and second lateral acceleration rates becomes equal to or greater than a first threshold value;

upon determining that the at least one of the detected values of the first and second lateral acceleration rates becomes equal to or greater than the first threshold value, start integrating detected values of the longitudinal acceleration rate, and determine whether the detected values of the first and second lateral acceleration rates are in a same direction;

upon determining that the detected values of the first and second lateral acceleration rates are in the same direction, determine whether an integrated value of the longitudinal acceleration rate, calculated up to a predetermined time point, is equal to or greater than a second threshold value that is different from the first threshold value;

upon determining that the integrated value of the longitudinal acceleration rate is equal to or greater than the second threshold value, determine that an oblique contact has occurred between the vehicle and an object;

upon determining that the integrated value of the longitudinal acceleration rate is less than the second threshold value, determine that a small overlap offset contact has occurred between the vehicle and the object;

upon determining that the detected values of the first and second lateral acceleration rates are not in the same direction, determine whether a difference between a detected value of the right frame longitudinal acceleration rate and a detected value of the left frame longitudinal acceleration rate are equal to or greater than a third threshold value that is different from the first and second threshold values;

upon determining that the difference between the detected value of the right frame longitudinal acceleration rate and the detected value of the left frame longitudinal acceleration rate are equal to or greater than the third threshold value, determine that an offset contact has occurred between the vehicle and the object;

upon determining that the difference between the detected value of the right frame longitudinal acceleration rate and the detected value of the left frame longitudinal acceleration rate are less than the third threshold value, and determining that the detected values of the first and second lateral acceleration rates are in opposite directions, each directed outward in a vehicle width direction, determine that a full-wrap contact has occurred between the vehicle and the object;

upon determining that the oblique contact, the small overlap offset contact, the offset contact or the full-wrap contact has occurred, determine whether the integrated value of the longitudinal acceleration rate is equal to or greater than a fourth threshold value that is different from the first to third threshold values; and upon determining that the integrated value of the longitudinal acceleration rate is equal to or greater than the fourth threshold value, output an airbag deployment command to activate an airbag device corresponding to a state of contact that occurred.

* * * * *